(12) United States Patent
Gerig et al.

(10) Patent No.: US 9,142,042 B2
(45) Date of Patent: Sep. 22, 2015

(54) METHODS AND SYSTEMS TO PRODUCE CONTINUOUS TRAJECTORIES FROM DISCRETE ANATOMICAL SHAPES

(75) Inventors: Guido Gerig, Salt Lake City, UT (US); Stanley Durrleman, Paris (FR); James Fishbaugh, Salt Lake City, UT (US)

(73) Assignee: UNIVERSITY OF UTAH RESEARCH FOUNDATION, Salt Lake City, UT (US)

( * ) Notice: Subject to any disclaimer, the term of this patent is extended or adjusted under 35 U.S.C. 154(b) by 269 days.

(21) Appl. No.: 13/613,850

(22) Filed: Sep. 13, 2012

(65) Prior Publication Data
US 2013/0188849 A1     Jul. 25, 2013

Related U.S. Application Data

(60) Provisional application No. 61/573,811, filed on Sep. 13, 2011, provisional application No. 61/671,383, filed on Jul. 13, 2012.

(51) Int. Cl.
| | |
|---|---|
| G06K 9/00 | (2006.01) |
| G06T 11/00 | (2006.01) |
| G06T 7/00 | (2006.01) |

(52) U.S. Cl.
CPC ............ *G06T 11/003* (2013.01); *G06T 7/0016* (2013.01); *G06T 2207/10088* (2013.01); *G06T 2207/30016* (2013.01)

(58) Field of Classification Search
None
See application file for complete search history.

(56) References Cited

U.S. PATENT DOCUMENTS

2009/0060299 A1* 3/2009 Hibbard et al. ............... 382/128

OTHER PUBLICATIONS

Vialard, François-Xavier. Hamiltonian approach to shape spaces in a diffeomorphic framework: from the discontinuous image matching problem to a stochastic growth model. Diss. PhD thesis, Ecole Normale Supérieure de Cachan, 2009.*
Trouvé, Alain, and François-Xavier Vialard. "Shape splines and stochastic shape evolutions: A second order point of view." arXiv preprint arXiv:1003.3895 (2010).*
Durrleman, Stanley. "Statistical models of currents for measuring the variability of anatomical curves, surfaces and their evolution." PhD diss., Nice, 2010.*
Durrleman et al., "Spatiotemporal atlas estimation for developmental delay detection in longitudinal datasets," MICCAI 2009, Part I. LNCS, vol. 5761, pp. 297-304 (2009).
Fishbaugh, J., et al., "A framework for longitudinal data analysis via shape regression," SPIE Medical Imaging 2012: Image Processing. vol. 8314. (2012).

*Primary Examiner* — Sumati Lefkowitz
*Assistant Examiner* — Carol Wang
(74) *Attorney, Agent, or Firm* — Michael Best & Friedrich LLP

(57) ABSTRACT

A method of estimating changes in an anatomical structure over time. The method includes steps of obtaining a plurality of shapes of an anatomical structure from a plurality of points in time, wherein the plurality of shapes of the anatomical structure includes a baseline shape of the anatomical structure; continuously deforming the baseline shape of the anatomical structure using a growth model parameterized by acceleration; fitting the deformed baseline shape to at least one of the plurality of shapes of the anatomical structure; and using the deformed baseline shape to estimate at least one shape of the anatomical structure at a time corresponding to a time that is different than any of the plurality of points in time.

31 Claims, 7 Drawing Sheets

US 9,142,042 B2

METHODS AND SYSTEMS TO PRODUCE CONTINUOUS TRAJECTORIES FROM DISCRETE ANATOMICAL SHAPES

FEDERALLY SPONSORED RESEARCH

This invention was made with government support under RO1 HD055741 (ACE, project IBIS) awarded by NIH and under U54 EB005149 (NA-MIC) awarded by NIH. The government has certain rights in the invention.

BACKGROUND

The present invention relates to methods and systems for estimating changes in an anatomical structure over time.

During the last several years, there has been an increased emphasis on longitudinal analysis in clinical studies. Specifically, longitudinal analysis has led to advances in the understanding of developmental disabilities such as autism and neurodegenerative diseases such as Huntington's disease. The framework for both studies is quite similar: clinically relevant measurements are extracted from imaging data and a continuous evolution is estimated by fitting a regression model to the discrete measures. Subsequent statistical analysis is conducted using the trajectories estimated during regression.

Traditional longitudinal analysis begins by extracting desired clinical measurements, such as volume or head circumference, from discrete imaging data. Typically, the continuous evolution of a scalar measurement is estimated by choosing a one-dimensional (1D) regression model, such as kernel regression or fitting a polynomial of fixed degree. This type of analysis not only leads to separate models for each measurement, but there is no clear anatomical or biological interpretation to aid in the selection of the appropriate paradigm.

SUMMARY

In one embodiment, the invention provides a method of estimating changes in an anatomical structure over time. The method includes steps of obtaining a plurality of shapes of an anatomical structure from a plurality of points in time, wherein the plurality of shapes of the anatomical structure includes a baseline shape of the anatomical structure; continuously deforming the baseline shape of the anatomical structure using a growth model parameterized by acceleration; fitting the deformed baseline shape to at least one of the plurality of shapes of the anatomical structure; and using the deformed baseline shape to estimate at least one shape of the anatomical structure at a time corresponding to a time that is different than any of the plurality of points in time.

In another embodiment, the invention provides a computer-based system for estimating changes in an anatomical structure over time. The system includes a processor and a storage medium operably coupled to the processor. The storage medium includes program instructions executable on the processor for obtaining a plurality of shapes of an anatomical structure from a plurality of points in time, wherein the plurality of shapes of the anatomical structure includes a baseline shape of the anatomical structure; continuously deforming the baseline shape of the anatomical structure using a growth model parameterized by acceleration; fitting the deformed baseline shape to at least one of the plurality of shapes of the anatomical structure; and using the deformed baseline shape to estimate at least one shape of the anatomical structure at a time corresponding to a time that is different than any of the plurality of points in time.

In yet another embodiment, the invention provides a computer-readable medium which includes first instructions executable on a computational device for obtaining a plurality of shapes of an anatomical structure from a plurality of points in time, wherein the plurality of shapes of the anatomical structure includes a baseline shape of the anatomical structure; second instructions executable on a computational device for continuously deforming the baseline shape of the anatomical structure using a growth model parameterized by acceleration; third instructions executable on a computational device for fitting the deformed baseline shape to at least one of the plurality of shapes of the anatomical structure; and fourth instructions executable on a computational device for using the deformed baseline shape to estimate at least one shape of the anatomical structure at a time corresponding to a time that is different than any of the plurality of points in time.

Other aspects of the invention will become apparent by consideration of the detailed description and accompanying drawings.

DETAILED DESCRIPTION

Figure 1:
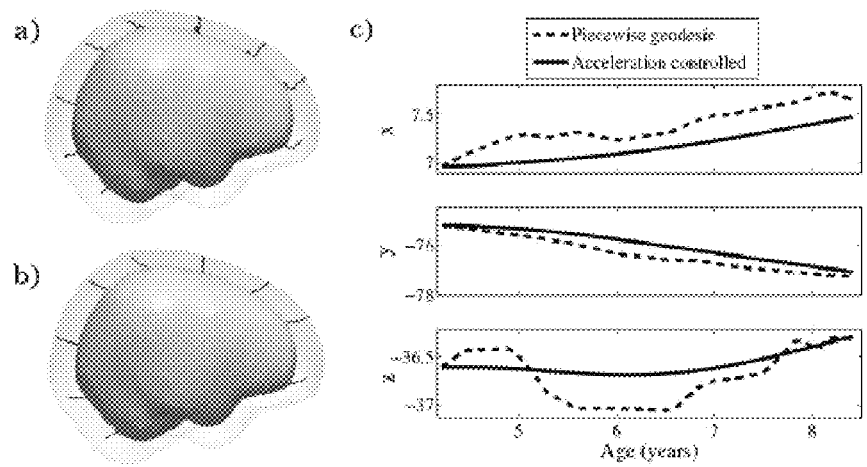
FIGS. 1(a) and 1(b) show shape evolution from baseline (solid) to final configuration (transparent) using a model based on piecewise geodesics (FIG. 1(a)) and the disclosed method (FIG. 1(b)) with point trajectories for selected particles displayed as black lines.
FIG. 1(c) shows the path of a point on the forebrain decomposed into coordinates, where growth is estimated using 15 target shapes, highlighting the speed discontinuities present in the piecewise geodesic evolution.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Longitudinal shape analysis often relies on the estimation of a realistic continuous growth scenario from data sparsely distributed in time. Disclosed herein is a new type of growth model which is parameterized by acceleration, in contrast to being parameterized by velocity, where acceleration more closely mimics the behavior of biological tissue as a mechanical system driven by external forces. The growth trajectories are estimated as smooth flows of deformations, which are twice differentiable. This differs from piecewise geodesic regression, for which the velocity may be discontinuous. The disclosed approach is evaluated on a set of anatomical structures of the same subject, which has been scanned (e.g. using MRI) sixteen times between four and eight years of age. It is shown that the acceleration-based method estimates smooth growth, demonstrating improved regularity compared to piecewise geodesic regression. Leave-several-out experiments show that the method is robust to missing observations, as well as being less sensitive to noise, and is therefore more likely to capture the underlying biological growth.

The study of time-dependent shapes is an emerging field in computational anatomy, with potential applications to early brain development, aging studies, and the analysis of evolving pathologic structures. As longitudinal data becomes more widely available, the need for computer models of anatomical evolution becomes increasingly important. At least two approaches can be followed: the first includes computing a realistic growth scenario from cross-sectional time series data. The second approach involves estimating several individual growth trajectories and combining them with a framework for 4D registration between growth trajectories or 4D atlas construction, to statistically analyze the growth variability within a population.

In either case, the methods rely greatly on the estimation of growth models from time series data, which are sparsely distributed in time. Growth models provide a tool to generate shapes at any instant in time (within the interval defined by the data), offering an opportunity to continuously measure shape properties. This is in contrast to using sparse measurements such as volume or circumference for 1D regression absent the shape information. The problem can be stated as "temporal shape regression" and can be solved by purely descriptive statistical methods like the extension of kernel regression to Riemannian manifolds, or by generative statistical models which define a parameterized family of realistic growth models and the one which best fits the actual data is estimated based on a regularized least-square criterion. The latter approach is favored because it makes explicit the assumptions which drive the estimation of growth trajectories and therefore enables the inclusion of realistic biological priors to constrain the estimation.

The growth model in some systems is based on a continuous flow of diffeomorphisms, with piecewise geodesics interpolating between shapes. This method estimates continuous non-linear growth between shapes, but does not guarantee differentiable growth as the speed of evolution is discontinuous at observation time points. The presently disclosed methods, on the other hand, are motivated by the assumption that the evolution of biological tissue is inherently smooth in time. If the growth of biological tissue is considered as a mechanical system driven by external forces, then the evolution of any particle on an anatomical surface is continuous with a continuous derivative and therefore does not change direction instantaneously, in contrast to what is generated by some growth models.

Temporal smoothness can be enforced via smooth interpolation between three-dimensional (3D) deformations estimated at discrete time-points, using B-splines or polynomial interpolation. However, these approaches are not based on the inference of a generic growth model, which captures the dynamics of the shape changes over time.

Based on these considerations, the new growth model disclosed herein is parameterized by acceleration, rather than velocity as in the large deformation setting of other systems. The estimated acceleration could be considered an indication of the forces which drive the growth of the anatomical structures. From this parameterization, one order of differentiability is gained and shape evolution is guaranteed to be smooth in both space and time. The disclosed methods further deviate from the large deformations framework by introducing a new regularization term which accounts for the total amount of acceleration. As a consequence, the model does not constrain the flow of deformation between shapes to be geodesic, or close to a geodesic path. By contrast, other approaches estimate twice differentiable trajectories as random perturbations of geodesic paths.

The evaluation of this methodology on real anatomical surfaces reveals the differences between this approach and piecewise geodesic regression. The presently-disclosed regression yields a twice differentiable evolution with improved regularity, thus discarding more noise from the data to fit a more realistic growth trajectory. Also, it is demonstrated that volume measurements taken out of the 3D shape regression are compatible with a 1D regression of these measurements, whereas piecewise geodesic regression appears to overfit. Lastly, it is shown via leave-several-out experiments that the present method better interpolates between data and is therefore more robust to missing observations. This suggests a greater ability to capture the underlying growth of the anatomical structures.

The problem of longitudinal shape regression involves inferring a continuous shape evolution from a discrete set of shapes $S_{t_i}$ observed at times $t_i$. Shape evolution is modeled as the continuous deformation of a baseline shape $S_0$, formally defined as $R_t = \phi_t(S_0)$ where $R_t$ corresponds to $S_0$ having undergone the transformation $\phi_t$ with t varying continuously within the time interval. The time-varying deformation $\phi_t$ is a general transformation from $R^N$ to $R^N$ with $\phi_0(S_0) = S_0$. The baseline shape is deformed over time to closely match the observed shapes ($R_{t_i} \sim S_{t_i}$) while the rigidity of the deformation is controlled via a regularity term. This leads to a variational problem in the form of a trade off between fidelity to data and regularity. For measuring shape similarity, shapes are modeled as currents.

The acceleration field a(x, t) is defined at point x and time t as a vector field of the form $$a(x, t) = \sum_{i=1}^{N} K^V(x, x_i(t))\alpha_i(t) \quad (1)$$

where $x_i$ are the shape points carrying a point force vector $\alpha_i$, and $K^V(x, y) = \exp(-\|x-y\|^2/\lambda^2_V)$ is a Gaussian kernel of dimension mass$^{-1}$ with standard deviation $\lambda_V$ controlling the spatial extent at which the acceleration field varies.

The time-varying point force vectors $\alpha_i(t)$ parameterize a flow of deformation $\phi_t(x_i(t))$ by the integration of the 2nd-order ODE $\ddot{\Phi}_t(x_i(t)) = a(x_i(t), t)$ with initial position $x_i(0)$ and initial velocity $\dot{\chi}_i(0)$. The initial positions of the particle are assumed to be fixed at the vertices of the baseline shape, while the initial velocities of the particles have to be determined by the algorithm.

Let $x(t)$, $a(t)$, and $\alpha(t)$ be the concatenation of the $x_i(t)$'s, $a_i(t)$'s, and the $\alpha_i(t)$'s. This parameterization leads to the specific regression criterion $$E(\dot{x}(0), \alpha(t)) = \sum_{t_i} \|\phi_{t_i}(x(0)) - x(t_i)\|_{W^*}^2 + \gamma \int_0^T \|a(t)\|_V^2 dt \qquad (2)$$

where $\|\cdot\|_{W^*}$ is the norm on currents and regularity is defined as $\|a(t)\|_V^2 = \alpha(t) K^V(x(t), x(t)) \alpha(t)$, interpreted as the 'total amount of acceleration', measured using the norm in the reproducing kernel Hilbert space defined by the interpolating kernel as disclosed by Durrleman ("Statistical models of currents for measuring the variability of anatomical curves, surfaces and their evolution," Ph.D. Thesis, Université de Nice-Sophia Antipolis (March 2010), incorporated herein by reference).

An adaptive step size gradient descent algorithm is implemented to calculate gradients. The gradient of the criterion (2) with respect to force vectors and initial velocity is written as $$\nabla_{\alpha_{i(t)}} E(t) = 2\gamma \alpha_i(t) + \eta_i^{\dot{x}}(t) \text{ and } \nabla_{\dot{\chi}_i(0)} E = \rho_i^{\dot{x}}(0) \qquad (3)$$

where variables $\rho_i^{x}(t)$ and $\rho_i^{\dot{x}}(t)$ satisfy coupled ODEs shown in Appendix A.

During each iteration of gradient descent, the trajectories of shape points are computed by solving the second-order ODE $\ddot{\Phi}_t(x_i(t)) = a(x_i(t), t)$ using a Verlet integration scheme. The auxiliary variables $\rho_i^{x}(t)$ and $\rho_i^{\dot{x}}(t)$ are computed using an Euler method with prediction/correction. Eventually the gradients given in equation (3) are computed. The algorithm may be started with zero initial velocity and force, though convergence may be faster when initial velocity is determined by geodesic diffeomorphic registration between the baseline and first target shape.

Thus, a new second-order regression model for estimating smooth evolution from a collection of time dependent shape data is disclosed herein. This is based on a new way of parameterizing growth based on acceleration, rather than velocity. Exemplary embodiments demonstrate on actual anatomical data that, compared to the standard piecewise geodesic model, the disclosed method is less sensitive to noise introduced during segmentation and is robust to missing data, and is therefore more likely to characterize the underlying biological growth. The evolution of volume extracted after shape regression was shown to be compatible with a ID regression on the observed volume measurements. In various embodiments, the disclosed method may be improved by additionally solving for initial positions of the shape points, e.g. as shown in Durrleman et al. (Spatiotemporal atlas estimation for developmental delay detection in longitudinal datasets. MICCAI 2009, Part I. LNCS, vol. 5761, pp. 297-304 (2009), incorporated herein by reference), to address the apparent underestimation of initial volume in FIG. 2.

While the methods disclosed herein have been implemented for 3D-surface data modeled as currents, in other embodiments the methods can be adapted to a variety of other data and metrics.

Accordingly, a framework is disclosed herein for the analysis of longitudinal data based on shape regression. It has been demonstrated on actual anatomical surfaces that volume measurements derived from shape evolution are compatible with a 1D regression of volume. However, shape regression provides a generic framework that allows for consistent treatment of multiple measurements and multiple shapes. The visualization of shape evolution was shown to improve data exploration, highlighting significant measurements that might have otherwise been overlooked. Finally, results are presented which show volume and circumference is larger in autistic children.

Figure 8:
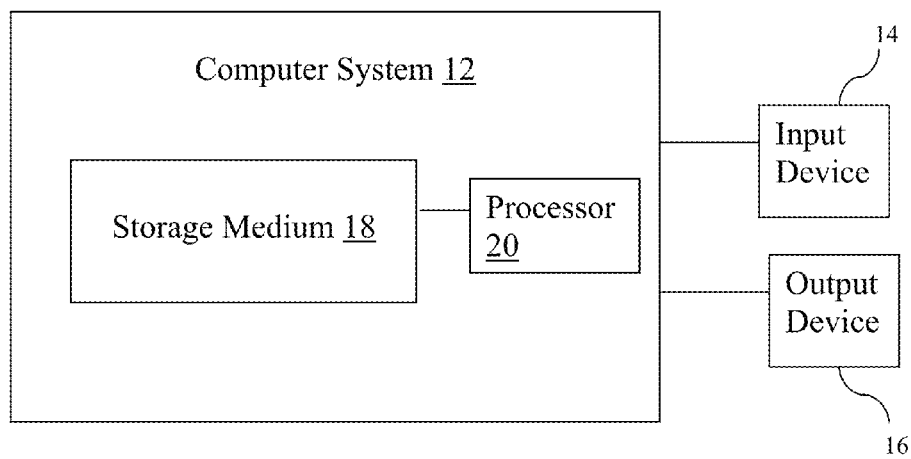
FIG. 8 shows a computer system which can be used to carry out embodiments of the invention.

In various embodiments, the invention includes a system for carrying out the methods disclosed herein. The system includes one or more computer systems, such as those shown in FIG. 8, in communication with one another through various wired and wireless communication means, which may include communications through the Internet. Each computer system may include an input device, an output device, a computer-readable medium, and a processor. Possible input devices include a keyboard, a computer mouse, a touch screen, and the like. Output devices include a cathode-ray tube (CRT) computer monitor, a liquid-crystal display (LCD) or LED computer monitor, and the like. Computer-readable media include various types of memory such as a hard disk, RAM, flash memory, and other transient and non-transient magnetic, optical, physical, or electronic memory devices. The processor may be any typical computer processor for performing calculations and directing other functions for performing input, output, calculation, and display of data in the disclosed methods and systems. Implementation of the system includes generating a set of instructions and data that are stored on one or more of the storage media and operated on by a controller. The data associated with the system can include image data and numerical data. In certain embodiments, the invention includes a computer-readable medium having instructions for carrying out embodiments of the present invention.

In one embodiment, the system may include a web page for facilitating input, control, analysis, and other functions. In other embodiments, the system may be implemented as a locally-controlled program on a local computer system which may or may not be accessible to other computer systems. In still other embodiments, the system may include modules which provide access to portable devices such as laptops, tablet computers, and smart phones.

In various embodiments, the data processed according to the disclosed methods and using the disclosed systems may be obtained from a number of sources and imaging modalities, including, without limitation, image data obtained using magnetic resonance imaging (MRI), computed tomography (CT), or ultrasound. The data may be collected from a variety of points in time which may be expressed in terms of the age of a subject or the timeframe of progression of a disease or disorder, and wherein time is expressed as at least one of days, weeks, months, years, or other suitable units of time. Similarly, images or other data that are generated using the disclosed methods and systems which correspond to estimated changes in an anatomical structure may have a time associated therewith which may be expressed in terms of the age of a subject or the timeframe of progression of a disease or disorder, and wherein time is expressed as at least one of days, weeks, months, years, or other suitable units of time.

In embodiments of the invention, the disclosed methods and systems may be used to analyze, diagnose, and/or prescribe treatment for diseases and conditions that benefit from longitudinal study, including conditions of the brain including autism, Huntington's disease, Alzheimer's disease, Parkinson's disease, schizophrenia, and traumatic brain injury. In addition, the disclosed methods and systems may also be used to analyze, diagnose, and/or prescribe treatment for conditions in other anatomical structures such as degenerative or other disease conditions of the heart, joints, liver, and kidneys. While many of the discussions and examples herein focus on humans as the subjects of analysis, the disclosed methods and systems may also be used to analyze, diagnose, and/or prescribe treatment for other subjects including animals such as non-human primates, other mammals, or any other suitable animal subject, including extinct subjects (e.g. for archeological or anthropological study).

The following non-limiting Examples are intended to be purely illustrative, and show specific experiments that were carried out in accordance with embodiments of the invention:

EXAMPLES

Example 1

To evaluate the method, longitudinal image data was used from a child who was scanned with MRI at sixteen time points between four and eight years of age. The MRI data was first rigidly aligned to establish a common reference frame. The intracranial volume and lateral ventricles were segmented from each image using an EM based tissue classification algorithm and a level-set based active contour segmentation tool.

The evolution of the intracranial surface was modeled using a regression model based on the piecewise geodesic flow of diffeomorphisms as described in Durrleman et al. The standard deviation of the Gaussian kernel controlling deformation was set to 50 mm, roughly 30% of the diameter of the baseline intracranial surface. For the scale of currents 20 mm was used, with a regularity weight of 0.1. Finally, time was discretized in increments of 0.0425 years. A growth trajectory was also produced using the proposed method with the same parameter settings as above except that regularity was weighted by 0.01 (the two weighted terms cannot be compared since they have different 'physical' dimension). The parameters were tuned empirically to produce regressions of comparable quality with both methods.

Shape evolution is considerably smoother using the proposed regression model as compared to the piecewise geodesic model. This is particularly evident in the trajectories of the shape points across time, a subset of which are shown in FIGS. 1(a)-1(c). It is an important distinction that the trajectories estimated by the method are not a smoothing of the piecewise geodesic method. Rather, the trajectories are the result of fundamentally different assumptions on the underlying model which results in a more realistic estimation of growth.

The smoothness constraints imposed by the model limit the shape variation that can be captured over short time periods. Consequently, the accuracy of the model was investigated by examining how closely the target data was matched: the estimated growth scenario decreases the initial sum of squared residual by 148%, compared to a 153% decrease from the piecewise geodesic method. While the method does not come as close to matching the target data, this suggests that the method is less sensitive to noise and less likely to overfit.

Figure 2:
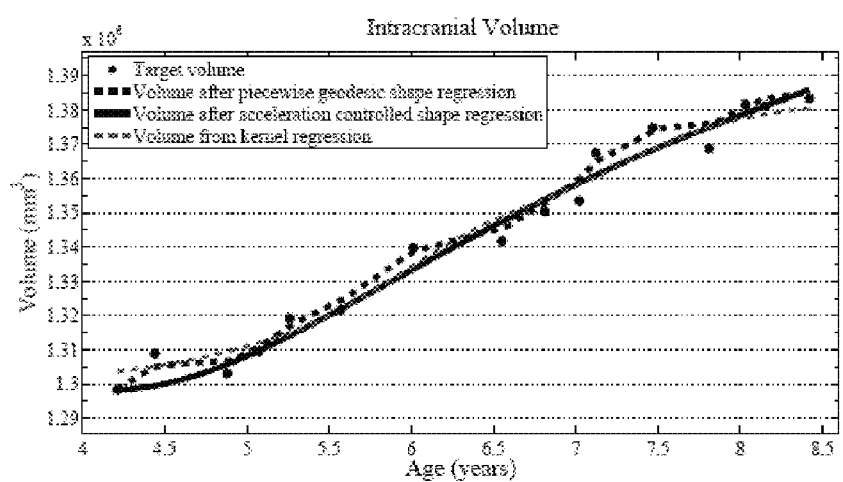
FIG. 2 shows volume measurements derived from the disclosed growth model which are consistent with a kernel regression ($\sigma=0.5$) performed on the sparse volume measurements, where the disclosed model describes the continuous evolution of shape while volume is measured after regression.

Next, the application of the model to the study of measurements derived from shape was investigated. A continuous non-linear model of volume is obtained, as shown in FIG. 2. The results are consistent with a 1D regression model, such as kernel regression, applied to the sparse volume measurements. However, modeling efforts were focused on capturing the evolution of shape, with continuous volume measurements resulting naturally from the estimated growth. In addition, the piecewise geodesic method appears to be overfitting, producing unrealistic volume measurements, further suggesting that the method disclosed herein is more robust in the presence of noisy data.

Finally, the evolution of the lateral ventricles, which exhibit considerably more complexity than the intracranial surface, is considered. The horns of the segmented lateral ventricles are as thin as a few millimeters, making regression particularly challenging. As with the intracranial volume, ventricle growth is estimated using a piecewise geodesic model and the disclosed acceleration-based model. The scale of deformation is set at 6 mm, the scale of currents to 2 mm, and regularity is weighted by 0.1 and 0.01, respectively.

Figure 3A:
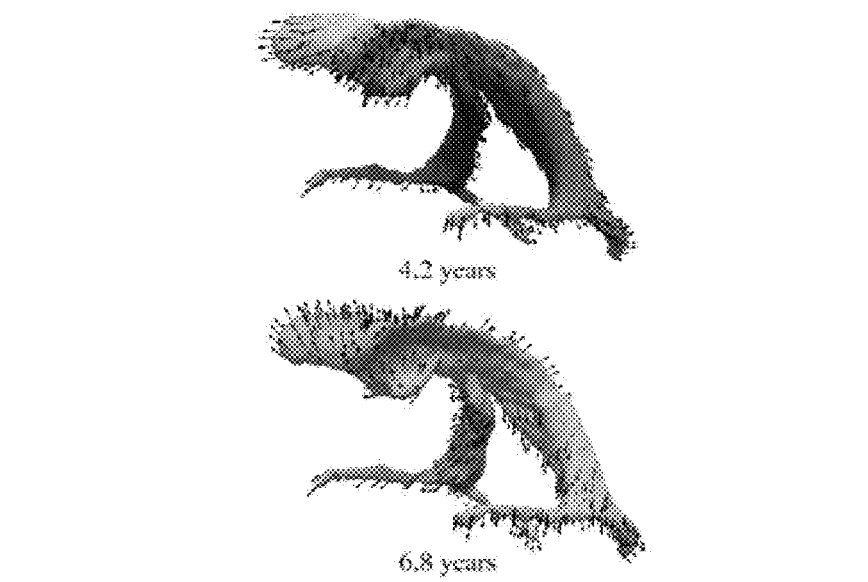
FIG. 3(a) shows snapshots from a continuous shape evolution of lateral ventricles estimated by the disclosed regression model, where acceleration vectors are displayed on the surface, with color denoting magnitude.
Figure 3B:
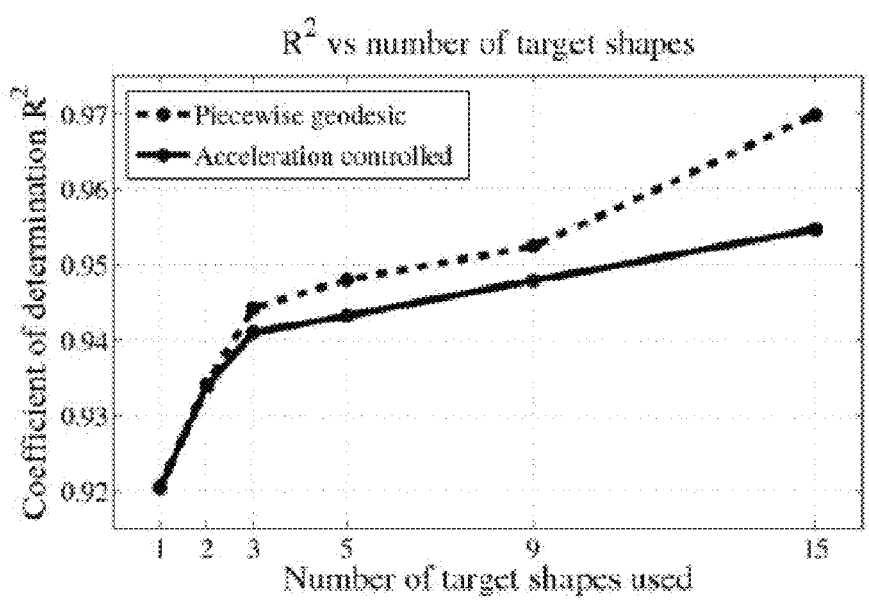
FIG. 3(b) shows the impact of the number of target shapes on $R^2$.

The impact of missing data is examined by performing leave-several-out experiments, the results of which are summarized in FIGS. 3(a) and 3(b). In all experiments, selected target shapes were chosen as uniformly across time as possible. The disclosed method demonstrates robustness with respect to the number of target shapes, with only minimal increase in the coefficient of determination $R^2$ when using more than three targets. This suggests that the disclosed method captures the underlying growth with limited data, as additional target data does not greatly alter the estimation. In contrast, piecewise geodesic regression is more influenced by additional target data and is therefore likely to overfit.

Example 2

In an additional application of this framework, a longitudinal database was used which includes data for seven healthy children and six children diagnosed with autism (or autism spectrum disorder). Each child had their brain scanned three times, at 6, 12, and 24 months old. The 6 and 12 month images were first rigidly co-registered to the 24 month image. Next, the left hemisphere, right hemisphere, and cerebellum were segmented via deformable registration with a template. Triangular meshes were extracted via marching cubes and were simplified and smoothed, resulting in a quality mesh for each subject. Finally, the 6 and 12 month shape complexes were rigidly co-registered to the 24 month shape complex to further reduce the amount of translation and rotation between time points.

Next, the growth scenario was jointly estimated for each subject's left hemisphere, right hemisphere, and cerebellum. The standard deviation of the Gaussian kernel $\lambda_V$ controlling the deformation was set to 10 mm in order to capture very detailed shape changes. For $\lambda_W$, the scale at which shape differences are considered noise, 4 mm was chosen for the hemispheres and 2 mm was chosen for the cerebellum. Regularity was weighted by 0.01 and time was discretized into increments of 0.37 months.

Figure 4:
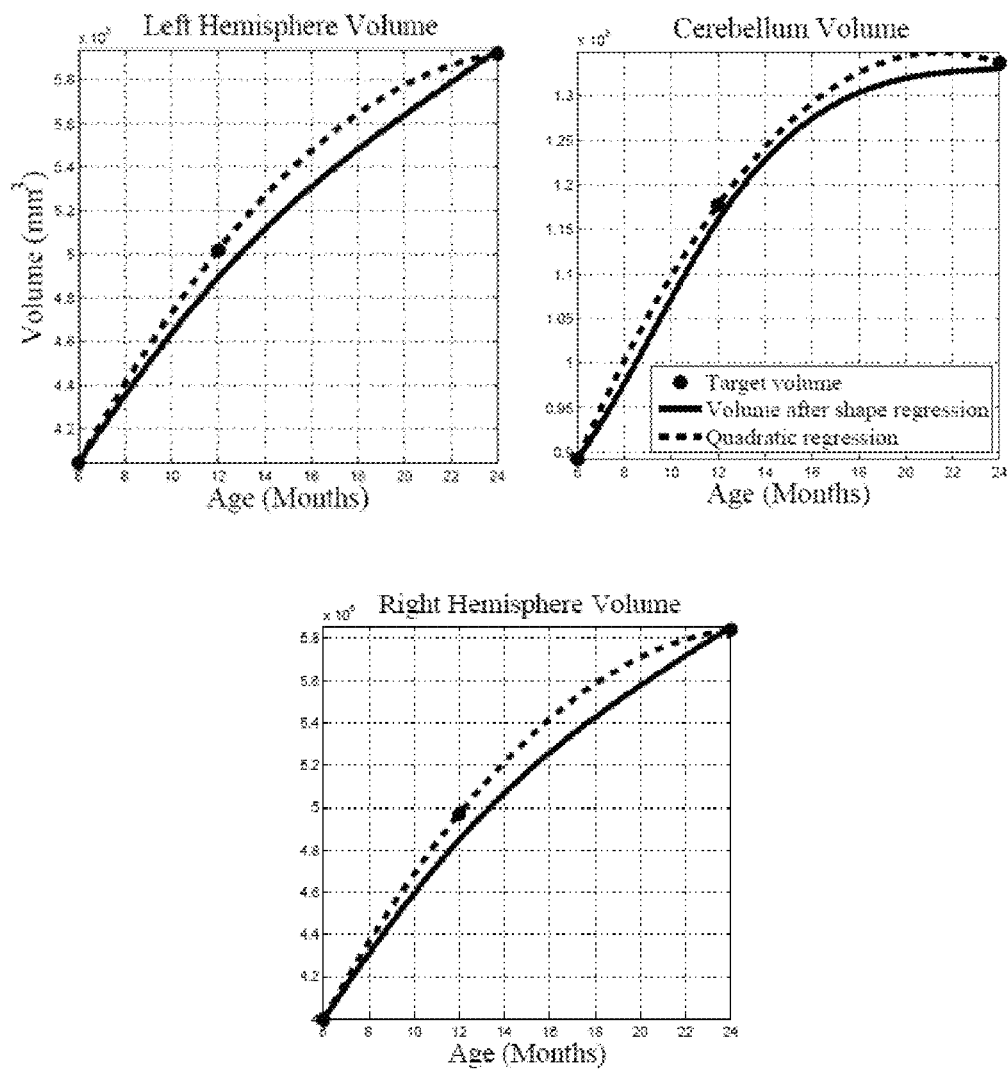
FIG. 4 shows volume measurements extracted after shape regression compared with quadratic regression on the discrete volume measurements, where the evolution of shape was estimated jointly on all shapes whereas three independent curves were estimated in the one-dimensional (1D) regression case.

First, the application of extracting scalar measurements from shape regression was investigated. FIG. 4 shows volume from one particular healthy subject extracted after shape regression as well as quadratic regression estimated using the sparse volume measurements. For the sparse measurements, separate 1D regressions were computed for each shape. In contrast, the disclosed shape regression paradigm provides a consistent framework for dealing with multiple shapes as well as multiple measurements. The regression only needs to be estimated once and incorporates important spatial relationships between shapes. Furthermore, the decrease in cerebellum volume at 22 months estimated by quadratic regression highlights the downside of using such models, as it is unlikely the true anatomy decreased in volume.

Figure 5:
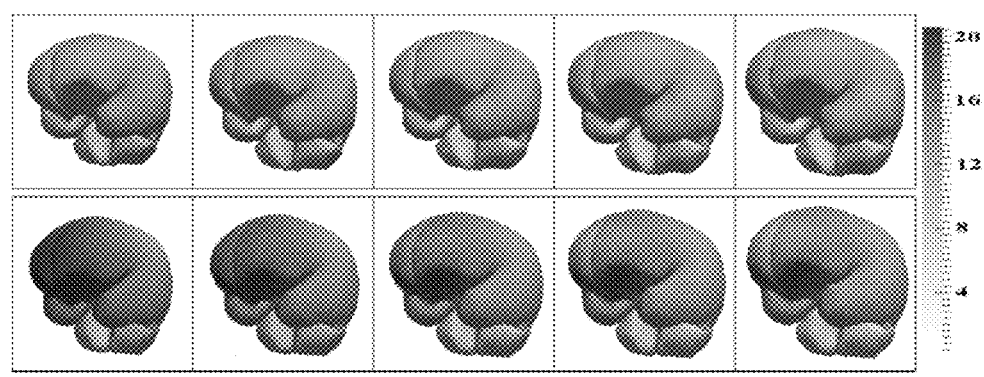
FIG. 5 shows snapshots of shape evolution for one healthy subject (top) and one autistic subject (bottom) with color denoting magnitude of velocity.

In addition to volume, circumference, and other common clinical measurements, other less evident features may be of significance. From the multitude of available measurements, it is difficult or impossible to determine which landmarks are most salient from the image data alone. The visualization of shape evolution is a powerful exploratory tool which allows a researcher to quickly and intuitively explore potentially significant measurements. Several snapshots of shape evolution for one healthy and one autistic child are shown in FIG. 5. This visualization makes clear that there is a difference in the way the brains of the two children develop. The autistic child experiences considerably faster growth to the forebrain in the anterior direction while the healthy child undergoes a mostly isotropic change in scale over time.

Figure 6:
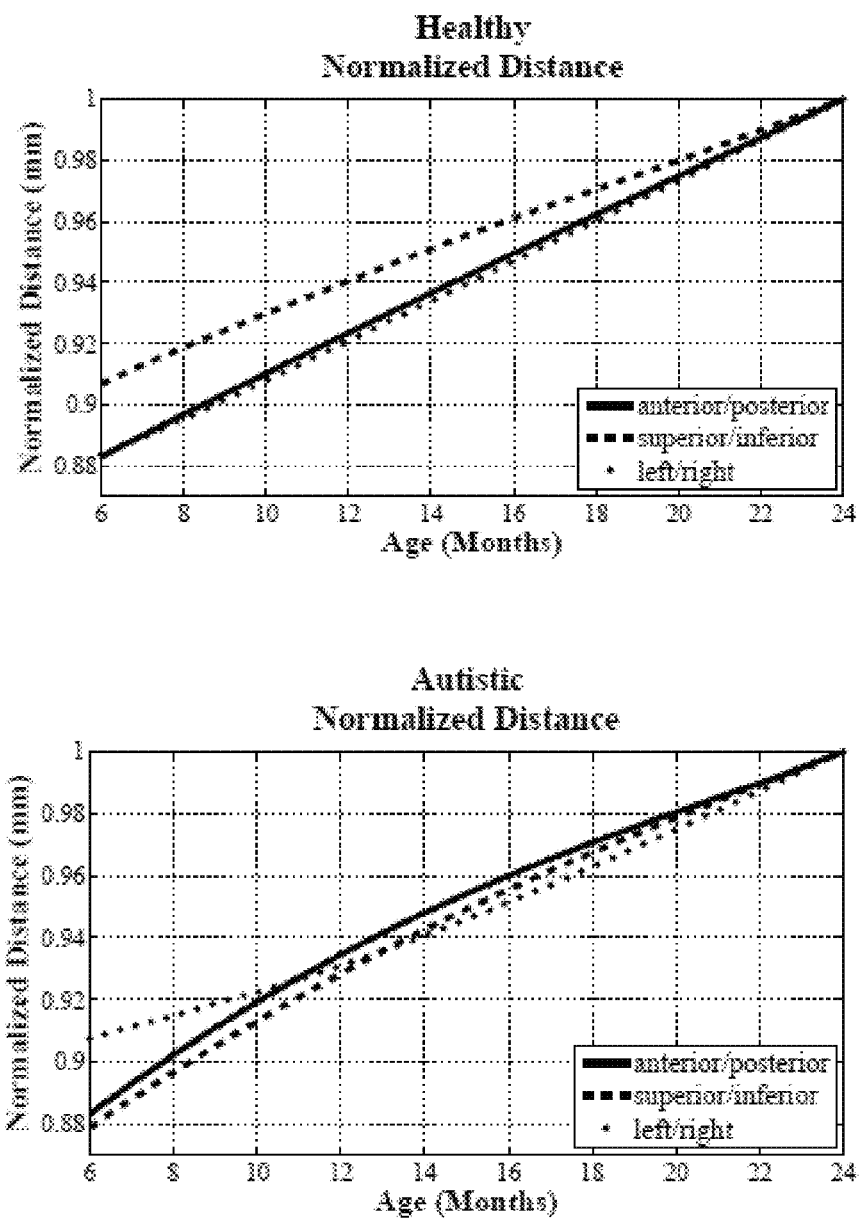
FIG. 6 shows evolution of the distance along the three major axes of the brain for a healthy (left) and autistic (right) child.

From this observation, the evolution in the direction of the three major axes of the brain was investigated. These measurements are extracted by computing the length, width, and height of the bounding box for each shape over time. A 'brain-box' analysis of one healthy and one autistic child is shown in FIG. 6, which shows the normalized distance over time in the three major directions. The similarity in the slopes of the curves in the healthy child confirm that the evolution is mostly isotropic. In contrast, the autistic child experiences the fastest initial growth in the anterior/posterior direction, with much slower growth in the left/right direction. Additionally, this example demonstrates the ability of shape regression to produce scalar trajectories that are either linear or non-linear without any prior constraint on linearity.

Figure 7:
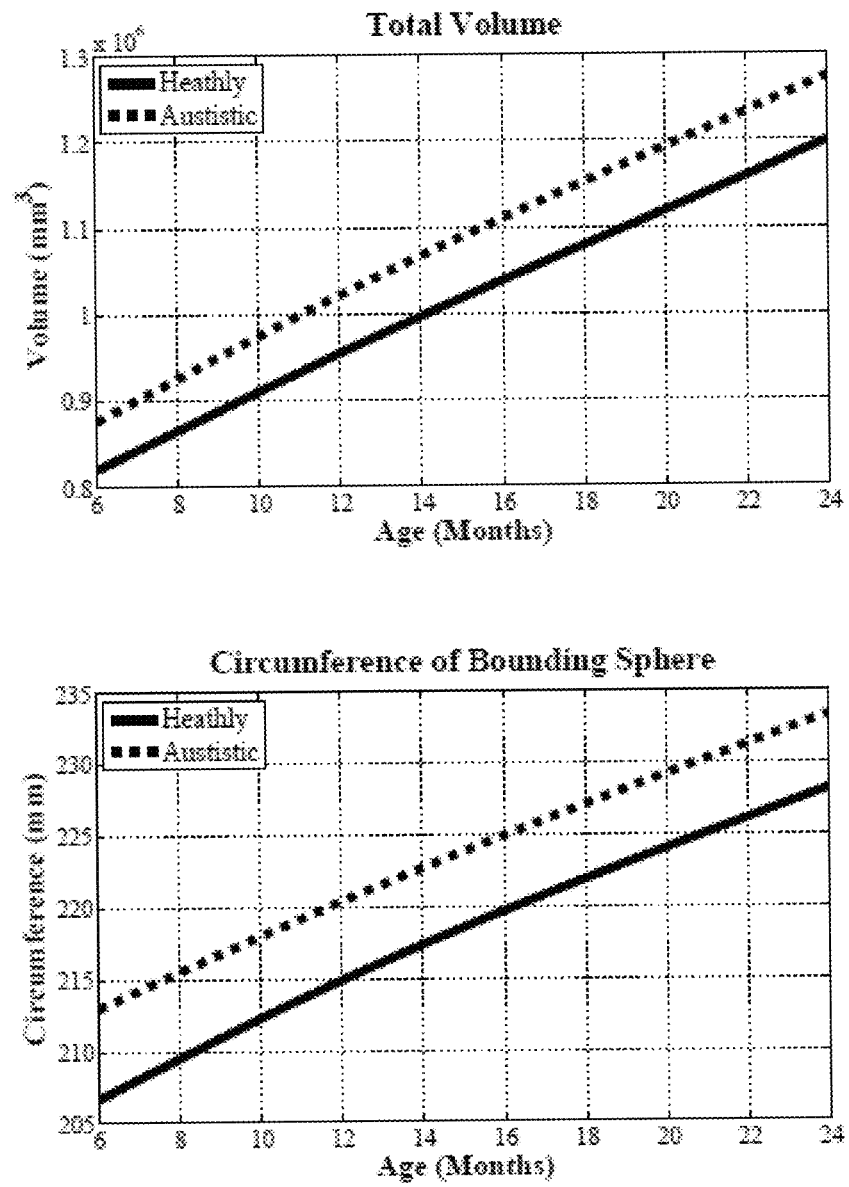
FIG. 7 shows average volume and circumference of bounding sphere between the two groups: healthy and autistic.

Finally, an exemplary embodiment is presented to illustrate an application for this framework. It has been shown that autistic children undergo accelerated head growth between 6 and 9 months of age, which is reflected in volume and head circumference measurements. Total volume is calculated as the sum of the volume of each individual shape, and circumference is measured as the distance around the bounding sphere. Both volume and circumference were measured continuously from the growth scenario estimated for each patient, and the findings were averaged, resulting in average trajectories of volume and circumference for healthy and autistic subjects. Results are summarized in FIG. 7, which shows that the average volume and circumference are larger in autistic children.

Thus, the invention provides, among other things, a method and a system for estimating changes in an anatomical structure over time. Various features and advantages of the invention are set forth in the following claims.

APPENDIX A

Differentiation of the Regression Criterion

Using matrix notation, the current state of the system of shape points is denoted by the vector $X(t)=(x(t), \dot{x}(t))^t$ concatenating position and velocity of every point. The state of the system is evolved by the following differential equation:

$$\dot{X}(t) = F(X(t), \alpha(t)) = \begin{pmatrix} \dot{x}(t) \\ \ddot{x}(t) = K(x(t) \cdot x(t))\alpha(t) \end{pmatrix} \quad (4)$$

with initial condition $X(0)=X_0=(x_0, \dot{x}_0)^t$.

Equation (2) is rewritten as $E(X(t))=\Sigma_{t_i} A(X(t_i)) + \int_0^T L(X(t), \alpha(t))dt$. Let $\delta E$ be a variation of the criterion E with respect to a variation $\delta\alpha(t)$ impulse vectors $\alpha(t)$, which induces a variation of the state variable X(t):

$$\delta E = \sum_{t_i} (d_{X(t_i)} A_i)\delta X(t_i) + \gamma \int_0^T (\partial_{X(t)} L(t))\delta X(t) + (\partial_{\alpha(t)} L(t))\delta\alpha(t) dt \quad (5)$$

The ODE in (4) shows that these variations $\delta X(t)$ satisfy a linear inhomogeneous ODE. The method of variation of parameters gives the solution $$\delta X(t) = R_{0t}\delta X_0 + \int_0^T R_{ut}\partial_{\alpha(u)} F(u)\delta\alpha(u) 1_{\{u \le t_i\}} du \quad (6)$$

where $R_{ut} = \exp(\int_u^t \partial X_{(s)F(s)} ds)$ and $1\{t \le t_i\} = 1$ if $t \le t_i$ and 0 otherwise.

Plugging this equation into (5) leads to:

$$\nabla_\alpha E(t) = \partial_{\alpha(t)} L(t)^t + \partial_{\alpha(t)} F(t)^t \eta(t) \text{ and } \nabla_{X_0} E = \eta(0) \quad (7)$$

where the auxiliary variable $\eta(t)$ is denoted as $$\eta(t) = \sum_i \nabla_{X_{t_i}} A_i 1_{\{t \le t_i\}} + \int_t^T \partial_X L(u)^t + \partial_X F(u)^t \eta(u) du \quad (8)$$

The vectors are decomposed into two blocks (the x-component and the $\dot{\chi}$-component). Due to the definition of A, L and F, one obtains $$\nabla_{X(t_i)} A_i = (\nabla_{x_i} A_i \quad 0)^t, \partial_X L =$$
$$(\gamma\alpha^t(\partial_1 + \partial_1)(K(x, x)\alpha) \quad 0)^t, \partial_\alpha L = 2\gamma\alpha^t K(x, x),$$
$$\partial_X F = \begin{pmatrix} 0 & 1 \\ (\partial_1 + \partial_2)K(x, x)\alpha & 0 \end{pmatrix}$$

and $\delta_\alpha F^x = (0 \, K(x, x))$.

Therefore, the gradient of the regression criterion with respect to the $L^2$ metric given in (7) is now equal to: $\nabla_\alpha E(t) = K(x(t) \cdot x(t))(2\gamma\alpha(t) + \eta^{\dot{x}}(t))$, where the auxiliary variable $\eta$ has been decomposed into $\eta = (\eta^x \cdot \eta^{\dot{x}})$.

The matrix $K(x(t), x(t))$ is precisely the Sobolev metric induced by the kernel on the set of $L^2$ functions, so the gradient is given in coordinates as in (3).

What is claimed is:

1. A method of estimating changes in an anatomical structure over time, comprising:
   obtaining a plurality of shapes of an anatomical structure from a plurality of points in time, wherein the plurality of shapes of the anatomical structure includes a baseline shape of the anatomical structure;
   continuously deforming the baseline shape of the anatomical structure using a growth model parameterized by acceleration comprising modeling shapes as currents comprising modeling an outer surface of the shape as a plurality of shape points, and wherein continuously deforming comprises iteratively calculating an acceleration of the plurality of shape points at a plurality of time points using a gradient descent algorithm, using an initial velocity of zero for each of the plurality of shape points;
   fitting the deformed baseline shape to at least one of the plurality of shapes of the anatomical structure; and
   using the deformed baseline shape to estimate at least one shape of the anatomical structure at a time corresponding to a time that is different than any of the plurality of points in time.

2. The method of claim 1, wherein the plurality of shape points has an acceleration field associated therewith, and wherein iteratively calculating an acceleration of the shape points at a plurality of time points further comprises controlling a spatial extent at which the acceleration field varies using a regularity term.

3. The method of claim 2, wherein fitting the deformed baseline shape to at least one of the plurality of shapes of the anatomical structure comprises fitting the deformed baseline shape to at least one of the plurality of shapes of the anatomical structure using regression.

4. The method of claim 3, wherein fitting the deformed baseline shape to at least one of the plurality of shapes of the anatomical structure using regression comprises applying a regression criterion, wherein the regression criterion comprises a regularization term which accounts for a total amount of acceleration.

5. The method of claim 1, wherein modeling shapes as currents comprises calculating growth trajectories as twice differentiable flows of deformations.

6. The method of claim 5, wherein calculating growth trajectories comprises integrating a second-order ordinary differential equation.

7. The method of claim 1, further comprising displaying the estimated shape to a user.

8. The method of claim 1, further comprising measuring a feature of the estimated shape.

9. The method of claim 1, further comprising at least one of diagnosing and prescribing treatment for a condition based on the estimated shape.

10. The method of claim 9, wherein the condition is one of autism, Huntington's disease, Alzheimer's disease, Parkinson's disease, schizophrenia, and traumatic brain injury.

11. The method of claim 1, wherein the plurality of shapes of an anatomical structure are obtained using magnetic resonance imaging, computed tomography, or ultrasound.

12. The method of claim 1, wherein the plurality of points in time includes at least one of an age of a subject and a timeframe of progression of a disease or disorder, and wherein time is expressed as at least one of days, weeks, months, or years.

13. The method of claim 1, wherein the anatomical structure is in a human subject.

14. The method of claim 1, wherein the anatomical structure is one of a brain structure, heart, joint, liver, and kidney.

15. The method of claim 1, wherein obtaining a plurality of shapes of an anatomical structure from a plurality of points in time comprises co-registering the plurality of shapes of an anatomical structure.

16. A computer-based system for estimating changes in an anatomical structure over time, the system comprising:
   a processor; and
   a storage medium operably coupled to the processor, wherein the storage medium includes program instructions executable on the processor for
      obtaining a plurality of shapes of an anatomical structure from a plurality of points in time, wherein the plurality of shapes of the anatomical structure includes a baseline shape of the anatomical structure;
      continuously deforming the baseline shape of the anatomical structure using a growth model parameterized by acceleration comprising modeling shapes as currents comprising modeling an outer surface of the shape as a plurality of shape points, and wherein continuously deforming comprises iteratively calculating an acceleration of the plurality of shape points at a plurality of time points using a gradient descent algorithm, using an initial velocity of zero for each of the plurality of shape points;
      fitting the deformed baseline shape to at least one of the plurality of shapes of the anatomical structure; and
      using the deformed baseline shape to estimate at least one shape of the anatomical structure at a time corresponding to a time that is different than any of the plurality of points in time.

17. The computer-based system of claim 16, wherein the plurality of shape points has an acceleration field associated therewith, and wherein program instructions executable on the processor for iteratively calculating an acceleration of the shape points at a plurality of time points further comprise program instructions executable on the processor for controlling a spatial extent at which the acceleration field varies using a regularity term.

18. The computer-based system of claim 17, wherein program instructions executable on the processor for fitting the deformed baseline shape to at least one of the plurality of shapes of the anatomical structure comprise program instructions executable on the processor for fitting the deformed baseline shape to at least one of the plurality of shapes of the anatomical structure using regression.

19. The computer-based system of claim 18, wherein program instructions executable on the processor for fitting the deformed baseline shape to at least one of the plurality of shapes of the anatomical structure using regression comprise program instructions executable on the processor for applying a regression criterion, wherein the regression criterion comprises a regularization term which accounts for a total amount of acceleration.

20. The computer-based system of claim 16, wherein program instructions executable on the processor for modeling shapes as currents comprise program instructions executable on the processor for calculating growth trajectories as twice differentiable flows of deformations.

21. The computer-based system of claim 10, wherein program instructions executable on the processor for calculating growth trajectories comprise program instructions executable on the processor for integrating a second-order ordinary differential equation.

22. The computer-based system of claim 16, wherein the system further comprises a graphical user interface and wherein the storage medium further comprises program instructions executable on the processor for displaying the estimated shape to a user on the graphical user interface.

23. The computer-based system of claim 16, wherein the storage medium further comprises program instructions executable on the processor for measuring a feature of the estimated shape.

24. The computer-based system of claim 16, further comprising at least one of diagnosing and prescribing treatment for a condition based on the estimated shape.

25. The computer-based system of claim 24, wherein the condition is one of autism, Huntington's disease, Alzheimer's disease, Parkinson's disease, schizophrenia, and traumatic brain injury.

26. The computer-based system of claim 16, wherein the plurality of shapes of an anatomical structure are obtained using magnetic resonance imaging.

27. The computer-based system of claim 16, wherein the plurality of points in time includes at least one of an age of a subject and a timeframe of progression of a disease or disorder, and wherein time is expressed as at least one of days, weeks, months, or years.

28. The computer-based system of claim 16, wherein the anatomical structure is in a human subject.

29. The computer-based system of claim 16, wherein the anatomical structure is one of a brain structure, heart, joint, liver, and kidney.

30. The computer-based system of claim 16, wherein obtaining a plurality of shapes of an anatomical structure from a plurality of points in time comprises co-registering the plurality of shapes of an anatomical structure.

31. A method of estimating changes in an anatomical structure over time, comprising:
- obtaining a plurality of shapes of an anatomical structure from a plurality of points in time, wherein the plurality of shapes of the anatomical structure includes a baseline shape of the anatomical structure;
- continuously deforming the baseline shape of the anatomical structure using a growth model parameterized by acceleration comprising modeling shapes as currents comprising modeling an outer surface of the shape as a plurality of shape points, and wherein continuously deforming comprises iteratively calculating an acceleration of the plurality of shape points at a plurality of time points using a gradient descent algorithm, further comprising determining an initial velocity for each of the plurality of shape points using geodesic diffeomorphic registration between the baseline and at least one of the plurality of shapes of the anatomical structure,
- fitting the deformed baseline shape to at least one of the plurality of shapes of the anatomical structure; and
- using the deformed baseline shape to estimate at least one shape of the anatomical structure at a time corresponding to a time that is different than any of the plurality of points in time.

* * * * *